United States Patent
Moeller (10) Patent No.: US 7,330,669 B2
(45) Date of Patent: Feb. 12, 2008

(54) OPTICAL HETERODYNE RECEIVER BASED ON OVERSAMPLING

(75) Inventor: Lothar Benedict Erhard Josef Moeller, Hazlet, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 603 days.

(21) Appl. No.: 10/827,824

(22) Filed: Apr. 20, 2004

(65) Prior Publication Data

US 2005/0232644 A1    Oct. 20, 2005

(51) Int. Cl.
*H04B 10/06*    (2006.01)

(52) U.S. Cl. ........................... 398/204; 398/202

(58) Field of Classification Search ........ 398/202–204, 398/205–214; 375/355
See application file for complete search history.

(56) References Cited

U.S. PATENT DOCUMENTS

| | | | | |
|---|---|---|---|---|
| 4,144,565 A * | 3/1979 | Bouknecht et al. ........... | 710/62 |
| 4,596,052 A | 6/1986 | Wright et al. ............... | 455/619 |
| 4,718,121 A | 1/1988 | Epworth ...................... | 455/619 |
| 4,780,888 A | 10/1988 | Solhjell et al. | |
| 5,052,051 A | 9/1991 | Naito et al. ................ | 455/619 |
| 5,115,332 A | 5/1992 | Naito et al. ................ | 359/189 |
| 5,325,226 A | 6/1994 | Khoe ......................... | 359/189 |
| 5,351,271 A | 9/1994 | Coquerel | |
| 5,414,550 A | 5/1995 | Ono ........................... | 359/191 |
| 5,452,118 A | 9/1995 | Maruska ..................... | 359/191 |
| 5,453,826 A | 9/1995 | Sugimoto et al. | |
| 5,463,461 A | 10/1995 | Horiuchi et al. ............ | 356/349 |
| 5,631,760 A | 5/1997 | Heidemann ................. | 359/191 |
| 5,774,064 A | 6/1998 | Lambropoulos et al. | |
| 5,777,765 A | 7/1998 | Deloddere et al. | |
| 6,259,529 B1 | 7/2001 | Sorin et al. ................. | 356/484 |
| 6,295,152 B1 | 9/2001 | Wedding | |
| 6,778,589 B1 * | 8/2004 | Ishii .......................... | 375/136 |
| 6,839,130 B2 | 1/2005 | Araki et al. | |
| 7,142,621 B2 * | 11/2006 | Vallet et al. ................ | 375/355 |
| 2003/0002833 A1 | 1/2003 | Futami et al. | |
| 2003/0170022 A1 * | 9/2003 | Moeller ...................... | 398/27 |
| 2004/0071247 A1 * | 4/2004 | Dunning et al. ............ | 375/355 |
| 2004/0091273 A1 | 5/2004 | Brissette et al. | |
| 2004/0151511 A1 | 8/2004 | Gill et al. | |
| 2005/0185969 A1 | 8/2005 | Moeller et al. ............. | 398/202 |
| 2005/0232644 A1 | 10/2005 | Moeller | |

FOREIGN PATENT DOCUMENTS

| | | |
|---|---|---|
| DE | 198 23 705 A1 | 12/1999 |
| EP | 0 508 885 A2 | 10/1992 |
| WO | WO 85/05234 | 11/1985 |

* cited by examiner

*Primary Examiner*—Jason Chan
*Assistant Examiner*—Quan-Zhen Wang (57) ABSTRACT

An optical receiver adapted to apply multiple-sampling processing to an intermediate frequency (IF) signal generated based on heterodyne detection of an optical communication signal. In one embodiment, the receiver has an optical-to-electrical signal converter coupled to a signal decoder adapted to process the IF signal generated by the converter to generate a bit sequence corresponding to the optical communication signal. To generate a bit value, the signal decoder first obtains two or more sample-bit values by sampling the IF signal two or more times per signaling interval. The decoder then applies a logical function to the sample-bit values, which produces the corresponding bit value for the bit sequence. Due to the multiple-sampling processing, a receiver of the invention does not require the time-consuming fine wavelength tuning of its local oscillator, which advantageously reduces the channel switching time achieved in the receiver compared to that in prior-art heterodyne receivers.

25 Claims, 5 Drawing Sheets

OPTICAL HETERODYNE RECEIVER BASED ON OVERSAMPLING

CROSS-REFERENCE TO RELATED APPLICATIONS

The subject matter of this application is related to that of U.S. patent application Ser. No. 10/782,231, filed Feb. 19, 2004, which is incorporated herein by reference.

BACKGROUND OF THE INVENTION

1. Field of the Invention

The present invention relates to optical communication equipment and, more specifically, to optical receivers.

2. Description of the Related Art

In heterodyne detection, a relatively weak communication signal is mixed with a relatively strong local oscillator (LO) signal having a frequency that is sufficiently close to the frequency of the communication signal to result in coherent phase interference. Due to said interference, the communication and LO signals mix to produce an intermediate-frequency (IF) signal. The IF signal carries the same information as the communication signal, but has a frequency that is equal to the frequency difference between the communication and LO signals. The power of the IF signal is proportional to the product of the amplitudes of the communication and LO signals. Therefore, when the amplitude of the local oscillator signal exceeds the amplitude of the communication signal, heterodyne detection provides signal amplification with respect to direct detection of the communication signal.

Figure 1:
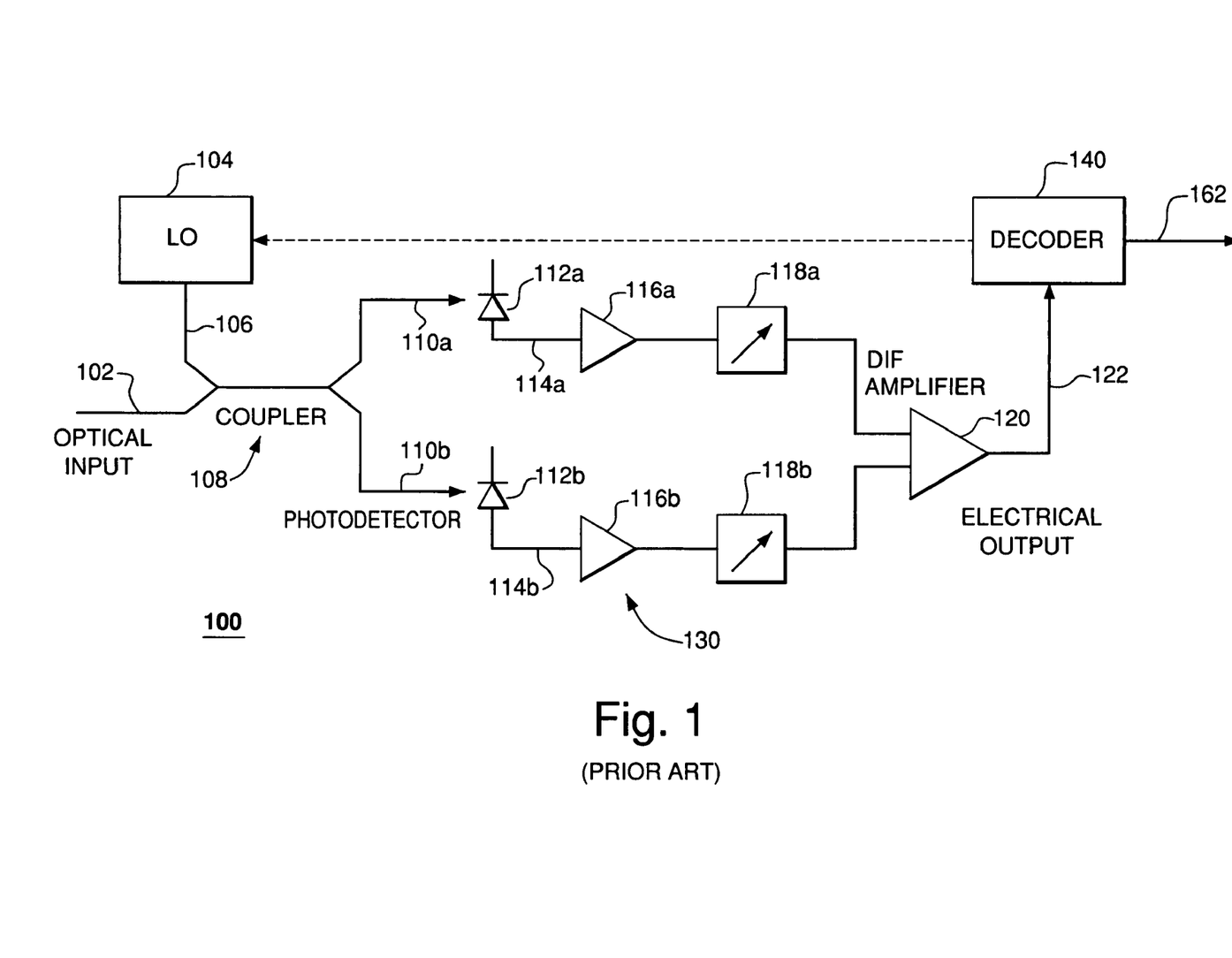
FIG. 1 shows a block diagram of a representative prior-art optical heterodyne receiver.

FIG. 1 shows a block diagram of a representative prior-art optical heterodyne receiver 100 having an optical-to-electrical (O/E) signal converter 130 coupled to a signal decoder 140. An optical communication signal 102 applied to O/E converter 130 and a continuous-wave LO signal 106 generated by a local oscillator (e.g., a laser) 104 are mixed in an optical coupler 108 to produce two mixed signals 110a and 110b preferably having a relative phase shift of 180 degrees. Each of mixed signals 110a-b includes an IF component as well as additional components at the frequencies corresponding to the wavelengths of signals 102 and 106. Each of mixed signals 110a-b is detected by a corresponding photodetector (e.g., a photodiode) 112, which, due to its bandwidth limitations, also serves as a low-pass filter. As a result, the additional components are filtered out by photo-detectors 112a-b, and electrical signals 114a-b generated by the photo-detectors represent the IF components of mixed signals 110a-b, respectively. Each of signals 114a-b is coupled, via an amplifier 116 and a variable attenuator 118, to a corresponding input of a differential amplifier 120. Amplifiers 116 and variable attenuators 118 serve to balance signals 114a-b such that these signals have equal amplitudes at the inputs of differential amplifier 120. Signal 122 generated by differential amplifier 120 is then processed in signal decoder 140 to recover the data carried by communication signal 102. Signal decoder 140 is adapted to (i) sample signal 122 one time per signaling interval, (ii) based on the signal sample, determine the value of a corresponding communication data bit, and (iii) output the determined value into a bit stream 162. A more detailed description of receiver 100 is provided in U.S. Pat. No. 4,718,121, the teachings of which are incorporated herein by reference.

When used in a wavelength-division multiplexing (WDM) communication system, receiver 100 locks onto a selected WDM channel by appropriately tuning the output wavelength of local oscillator 104. Local oscillator 104 is typically a distributed-feedback (DFB) laser controlled by temperature and/or injection current. Currently, DFB lasers are capable of reproducing a selected wavelength with an accuracy of only about 0.01 to 0.1 nm. Due to wavelength errors inherent to DFB lasers, the LO frequency deviates from the value prescribed for the selected WDM channel and some additional fine wavelength tuning of the DFB laser is usually required to better reproduce the selected wavelength and reduce the number of decoding errors in signal decoder 140 induced by the initial wavelength error. The dashed line in FIG. 1 indicates a feedback line that enables this fine wavelength tuning. Disadvantageously, the fine wavelength tuning significantly increases the channel-switching time in a WDM receiver.

SUMMARY OF THE INVENTION

Problems in the prior art are addressed, in accordance with the principles of the present invention, by an optical receiver adapted to apply multiple-sampling processing to an intermediate frequency (IF) signal generated based on heterodyne detection of an optical communication signal. In one embodiment, the receiver has an optical-to-electrical signal converter coupled to a signal decoder adapted to process the IF signal generated by the converter to generate a bit sequence corresponding to the optical communication signal. To generate a bit value, the signal decoder first obtains two or more sample-bit values by sampling the IF signal two or more times per signaling interval. The decoder then applies a logical function to the sample-bit values, which produces the corresponding bit value for the bit sequence. Due to the multiple-sampling processing, a receiver of the invention does not require the time-consuming fine wavelength tuning of its local oscillator, which advantageously reduces the channel switching time achieved in the receiver compared to that in prior-art heterodyne receivers.

According to one embodiment, the present invention is a method of signal processing, comprising: (A) converting a first optical signal into an electrical signal having an intermediate frequency and an amplitude corresponding to optical power of the first optical signal; (B) sampling the electrical signal two or more times per signaling interval to generate two or more sample-bit values; and (C) applying a logical function to the two or more sample-bit values to generate a bit sequence corresponding to the optical signal.

According to another embodiment, the present invention is an optical receiver, comprising: a signal converter adapted to convert a first optical signal into an electrical signal having an intermediate frequency and an amplitude corresponding to optical power of the first optical signal; and a signal decoder coupled to the signal converter and adapted to: (i) sample the electrical signal two or more times per signaling interval to generate two or more sample-bit values; and (ii) apply a logical function to the two or more sample-bit values to generate a bit sequence corresponding to the optical signal.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 2:
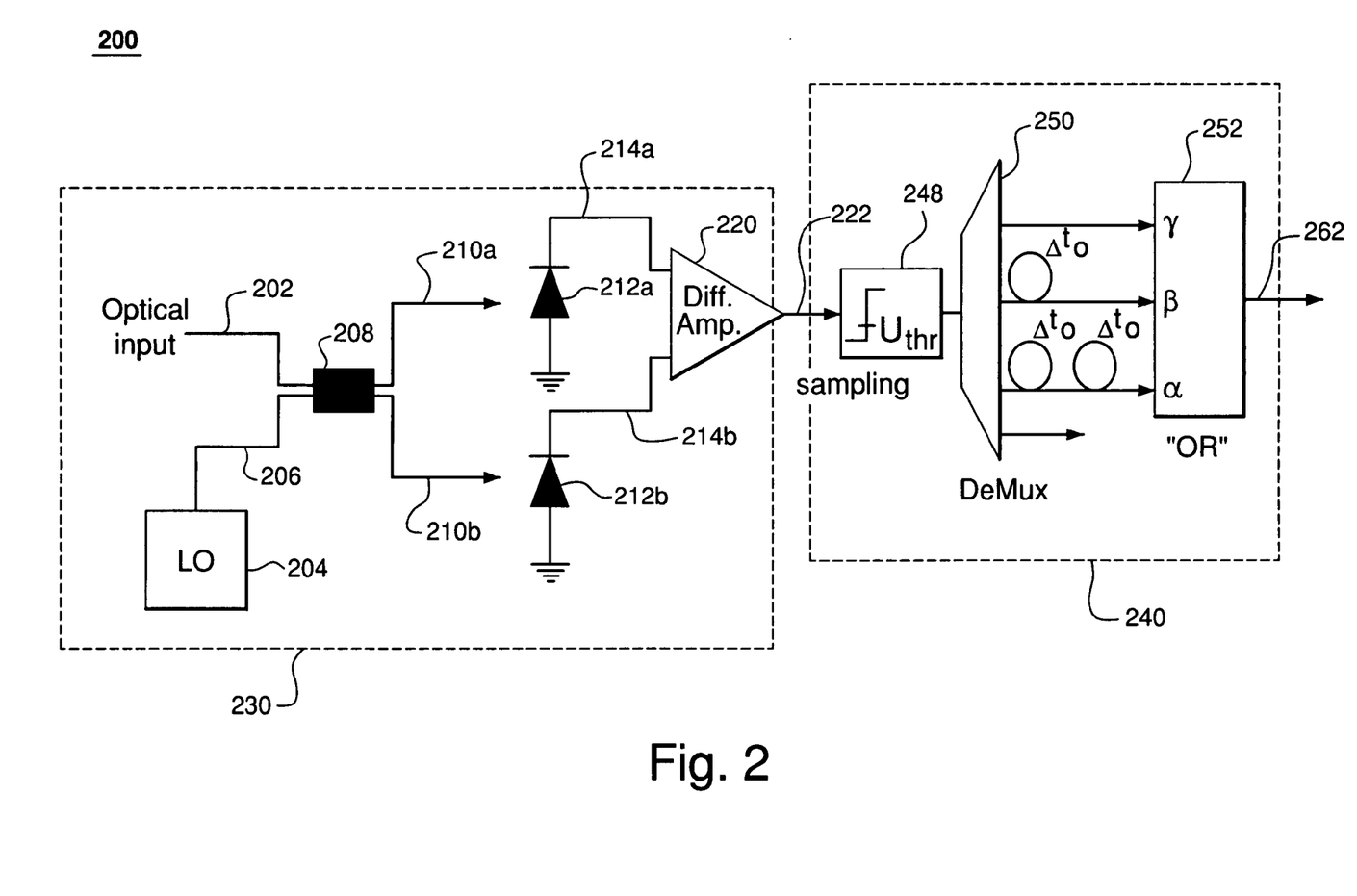
FIG. 2 shows a block diagram of an optical heterodyne receiver according to one embodiment of the invention.

FIG. 2 shows a block diagram of a heterodyne receiver 200 according to one embodiment of the invention. Receiver 200 has an optical-to-electrical (O/E) signal converter 230 coupled to a signal decoder 240. O/E converter 230 operates similar to O/E converter 130 (FIG. 1) and converts an optical communication signal 202 into an electrical IF signal 222. IF signal 222 is then processed in decoder 240 using an oversampling technique to generate a bit stream 262 having data corresponding to communication signal 202. As will be further explained below, due to the oversampling processing, receiver 200 does not require additional fine wavelength tuning of its local oscillator and can reliably operate with the wavelength accuracy provided by DFB lasers. This advantageously reduces the channel switching time achieved in receiver 200 compared to that in prior-art heterodyne receivers.

O/E converter 230 has an optical coupler 208, which is similar to optical coupler 108 of receiver 100. Optical coupler 208 mixes communication signal 202 with a continuous-wave signal 206 generated by a local oscillator 204 to produce two mixed optical signals 210a and 210b. Optical signals 210a-b are applied to photo-detectors 212a-b, which generate electrical signals 214a-b, respectively. Signals 214a-b can be balanced using circuitry similar to that in O/E converter 130, i.e., amplifiers 116 and variable attenuators 118 (not shown in FIG. 2). Electrical signals 214a-b are then applied to a differential amplifier 220 to generate IF signal 222. Assuming that signals 214a-b are balanced, they can be expressed using Eq. (1) as follows:

$$I_a = \sigma \left( \sum_{n=1}^{N} \frac{1}{4} P_{D,n} + \frac{1}{2} \sqrt{P_{D,k} P_L} \sin(\Delta\omega t + \varphi_0) + \frac{1}{4} P_L \right) \quad (1a)$$

$$I_b = \sigma \left( \sum_{n=1}^{N} \frac{1}{4} P_{D,n} - \frac{1}{2} \sqrt{P_{D,k} P_L} \sin(\Delta\omega t + \varphi_0) + \frac{1}{4} P_L \right) \quad (1b)$$

where $I_{a,b}$ are the currents corresponding to signals 214a and 214b, respectively; $\sigma$ is a constant representing the conversion efficiency of light into current by photo-detectors 212a-b; n is an index of a WDM channel; N is the number of WDM channels in the system; k is the index of a selected WDM channel; $P_{D,n}$ is the power in signal 202 corresponding to the n-th WDM channel; $P_{D,k}$ is the power in signal 202 corresponding to the selected WDM channel; $P_L$ is the power of LO signal 206; $\Delta\omega$ is the frequency difference between the selected WDM channel in signal 202 and LO signal 206; and $\varphi_0$ is the phase shift between the selected WDM channel and LO signal 206 at time t=0. Further, assuming that the gain of differential amplifier 220 is equal to 1, the current ($I_\Delta$) corresponding to IF signal 222 can be expressed using Eq. (2) as follows:

$$I_\Delta = I_a - I_b = \sigma \sqrt{P_{D,k} P_L} \sin(\Delta\omega t + \varphi_0) \quad (2)$$

As apparent from Eq. (2), for on/off keying, $I_\Delta$ is substantially zero during a signaling interval corresponding to an optical "0" and is an oscillating signal having the intermediate frequency ($\Delta\omega$) during a signaling interval corresponding to an optical "1".

In decoder 240, IF signal 222 is applied to a decision circuit 248 designed to sample the IF signal multiple times per signaling interval. In the embodiment shown in FIG. 2, communication signal 202 may be a 10-Gb/s signal, and decision circuit 248 is adapted to sample IF signal 222 four times per signaling interval, which corresponds to a 25-ps interval ($\Delta t_0$) between two adjacent sampling points. In each sampling point, decision circuit 248 generates a signal sample, compares it with a decision threshold value ($U_{thr}$), and outputs a binary value corresponding to the comparison result. More specifically, when a signal sample is greater than or equal to the decision threshold value, a binary "1" is generated. Similarly, when a signal sample is lower than the decision threshold value, a binary "0" is generated. Thus, the bit stream generated by decision circuit 248 has four sample bits per each communication data bit. Decoder 240 processes three of the four sample bits per signaling interval as will be described below to determine the value of the communication data bit and leaves the remaining one sample bit per signaling interval unutilized.

To separate the unutilized bits from the bit stream generated by decision circuit 248, decoder 240 has a de-multiplexer 250 having four output ports. Each output port of de-multiplexer 250 receives one bit from the bit stream during each signaling interval, with three particular output ports receiving sample bits for further processing and the remaining one output port receiving bits that are not utilized. The three particular output ports are coupled to an "OR" gate 252 adapted to apply an "OR" function to the received sample bits and generate bit stream 262. Note that appropriate time-delay elements, $\Delta t_0$, are inserted between gate 252 and output ports of de-multiplexer 250 to compensate for the relative time delays between the sample bits.

Figure 3A:
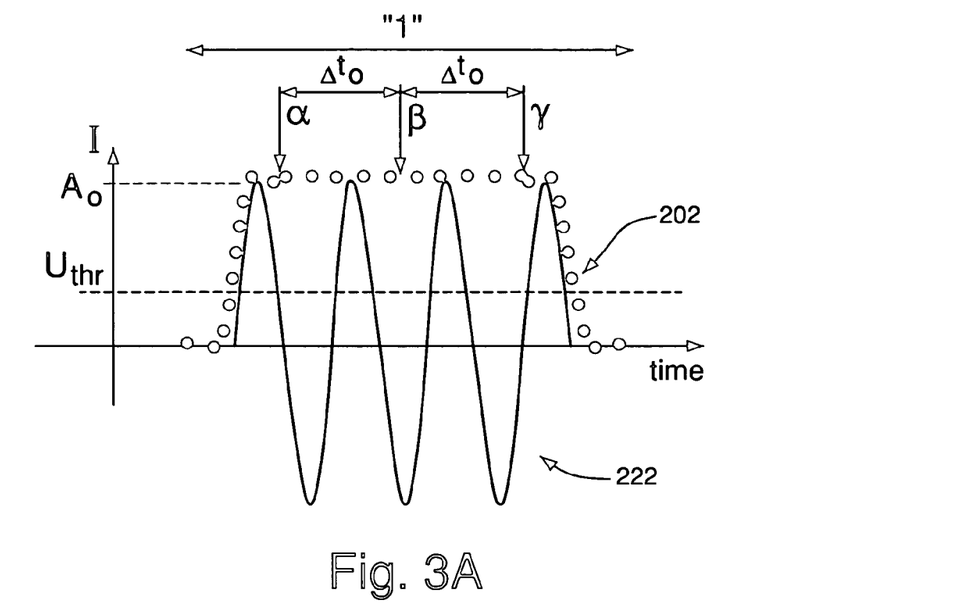
FIGS. 3A-B graphically illustrate sample-bit processing implemented in the receiver shown in FIG. 2.
Figure 3B:
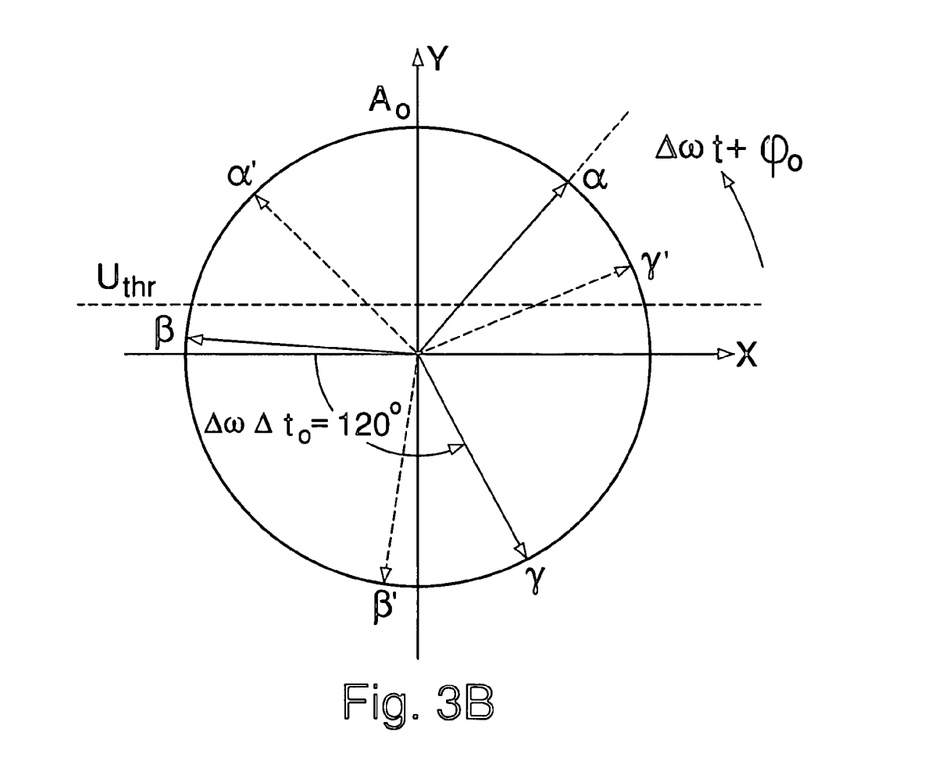

FIGS. 3A-B graphically illustrate sample-bit processing implemented in receiver 200. More specifically, FIG. 3A is a time-domain graph showing how a portion of signal 222 corresponding to an optical "1" is processed, and FIG. 3B is a phasor diagram corresponding to FIG. 3A. In FIG. 3A, the dotted line represents an envelope of signal 202 corresponding to an optical "1", the solid oscillating curve shows the corresponding portion of IF signal 222, and the horizontal dashed line indicates the decision threshold value ($U_{thr}$) of decision circuit 248. The vertical arrows separated by time intervals $\Delta t_0$ and labeled $\alpha$, $\beta$, and $\gamma$, respectively, represent the timing of three sampling points corresponding to the three sample bits processed in decoder 240. In FIG. 3B, IF signal 222 is represented by a rotating vector having a length of $A_0$, wherein the angle between the X-axis and the rotating vector is $\Delta\omega t+\phi_0$ and the projection of the rotating vector onto the Y-axis is the instant value of the IF signal.

Referring to FIG. 3B, in a preferred configuration, the wavelength of local oscillator 204 is selected in accordance with Eq. (3) as follows:

$$\Delta\omega\Delta t_0 = 2\pi/3 \qquad (3)$$

which causes the positions of the rotating vector corresponding to sampling points α, β, and γ to be separated by 120 degrees. The two sets of vectors labeled (α, β, γ) and (α', β', γ') correspond to two different values of the initial phase shift $\phi_0$. From different vector orientations exemplified by these two sets, one can determine that, if the decision threshold value of decision circuit 248 is selected from the following range $0<U_{thr}<A_0/2$, then, for any value of $\phi_0$, at least one vector in a vector set has a Y-axis projection value greater than $U_{thr}$. As a result, at least one of the sample bits corresponding to an optical "1" will have a value of "1", and "OR" gate 252 will output a binary "1" into bit stream 262, thereby correctly interpreting the corresponding optical bit.

Processing of an optical "0" in receiver 200 is relatively straightforward and can be summarized as follows. For an optical "0", the amplitude of the rotating vector shown in FIG. 3B is substantially zero. As a result, each sample bit generated by decision circuit 248 during the corresponding sampling interval is also zero. "OR" gate 252 applying an "OR" function to three zeros will output a binary "0" into bit stream 262, thereby correctly interpreting the corresponding optical bit.

Figure 4:
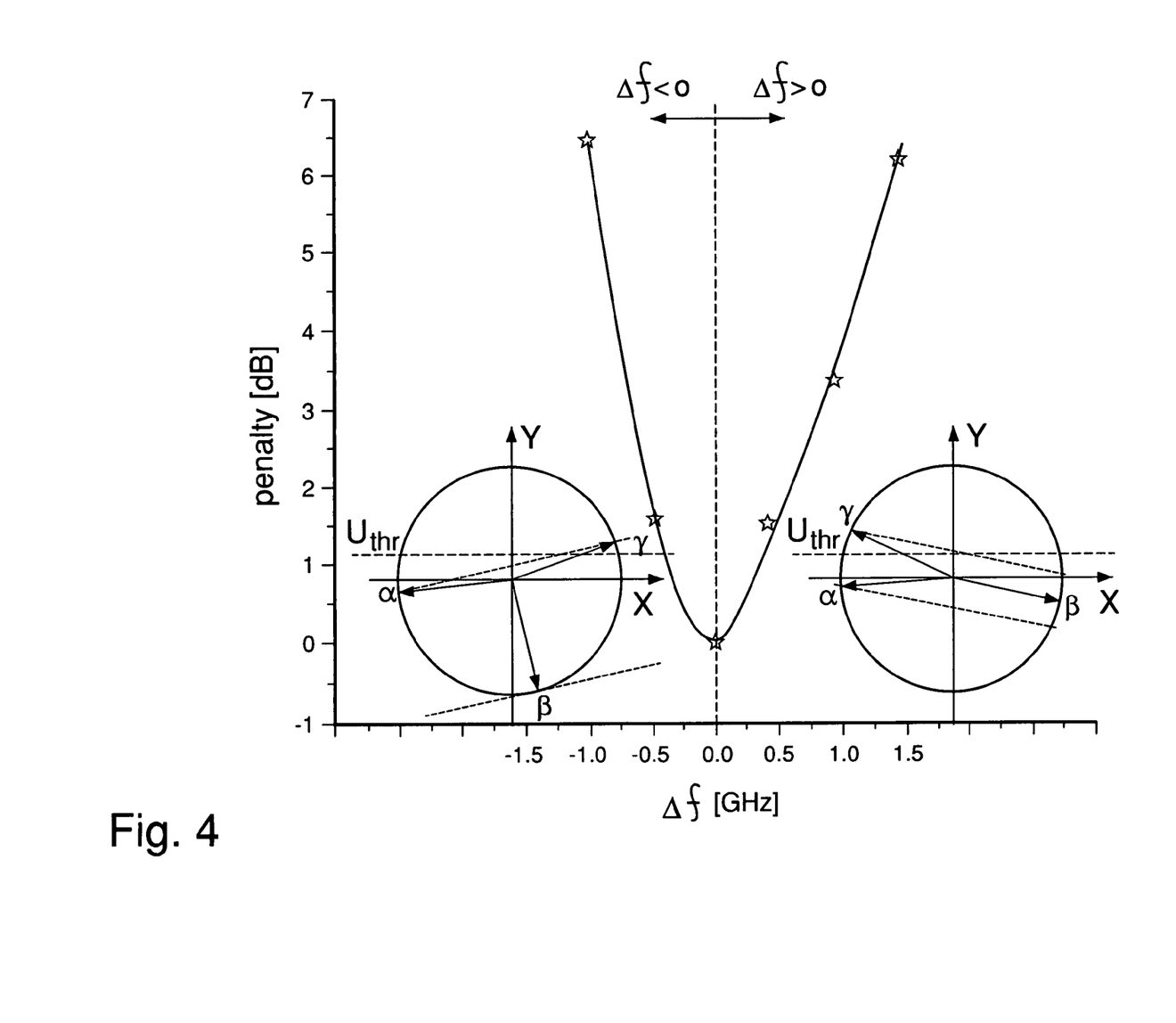
FIG. 4 graphically illustrates the power penalty incurred by the receiver shown in FIG. 2 due to wavelength errors in its local oscillator.

FIG. 4 graphically illustrates the power penalty incurred by receiver 200 due to a wavelength error in local oscillator 204. More specifically, the horizontal axis (Δf) in FIG. 4 represents a frequency deviation value with respect to the frequency corresponding to Eq. (3), where $\Delta\omega=2\pi\times13.33$ GHz. The vertical axis in FIG. 4 represents an increase in the power of IF signal 222 that is necessary to maintain the bit-error rate (BER) at a level of $10^{-6}$. The power increase can be achieved by increasing the power of either signal 202 or signal 206, or both. The insets in FIG. 4 show phasor diagrams corresponding to representative negative and positive values of Δf and should be compared with the phasor diagram shown in FIG. 3B, which corresponds to the case of Δf=0. As can be seen in the insets, frequency deviations may produce a configuration, in which all three vectors (α, β, γ) have Y-axis projection values below $U_{thr}$. This configuration would induce a decoding error in decoder 240. By increasing the amplitude of IF signal 222 while keeping the value of $U_{thr}$ constant, one can cause the Y-axis projection of at least one vector to cross the threshold and eliminate that decoding error. One can see that a frequency deviation value of about ±0.5 GHz causes a penalty of about 1.5 dB. For comparison, a similar frequency deviation would render prior-art receiver 100 substantially inoperable unless fine wavelength tuning were performed.

Figure 5:
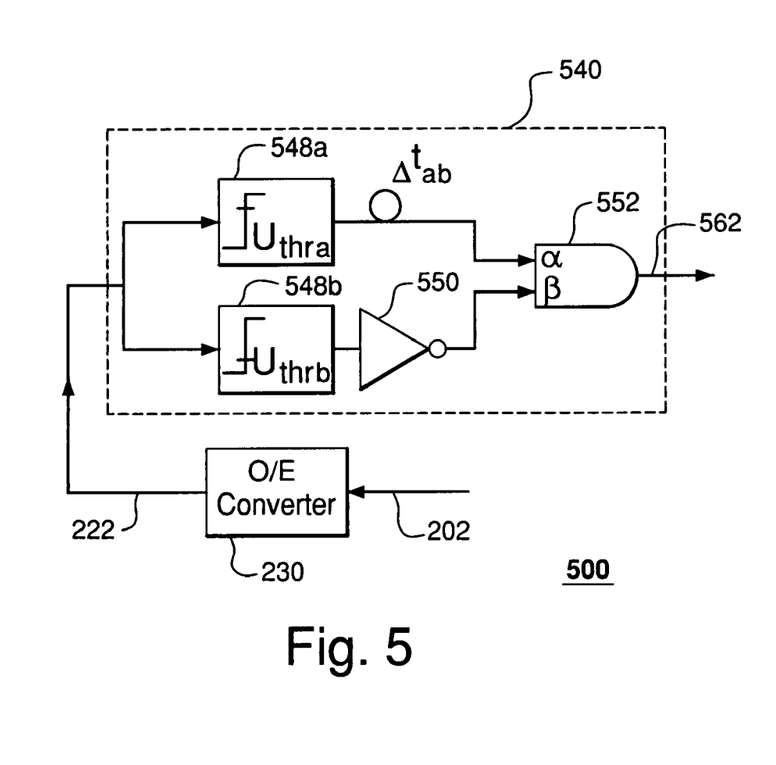
FIG. 5 shows a block diagram of an optical heterodyne receiver according to another embodiment of the invention.

FIG. 5 shows a block diagram of a heterodyne receiver 500 according to another embodiment of the invention. Similar to receiver 200 (FIG. 2), receiver 500 has an optical-to-electrical (O/E) signal converter 230. However, in receiver 500, O/E converter 230 is coupled to a signal decoder 540, which is adapted to process IF signal 222 using an oversampling technique different from that employed in decoder 240 of receiver 200. Similar to signal decoder 240, signal decoder 540 generates a bit stream 562 having the data corresponding to communication signal 202. Similar to receiver 200, receiver 500 does not require additional fine wavelength tuning of its local oscillator and can reliably operate with the wavelength accuracy provided by conventional DFB lasers.

In decoder 540, IF signal 222 is applied to decision circuits 548a-b, each of which is similar to decision circuit 248 of receiver 200. However, unlike decision circuit 248, each of decision circuits 548a-b samples IF signal 222 only one time per signaling interval. In addition, decision circuits 548a-b generate signal samples such that there is a time delay of $\Delta t_{ab}$ between the sample generated by decision circuit 548a and the sample generated by decision circuit 548b. Each of decision circuits 548a-b compares the corresponding sample with a decision threshold value, and outputs a binary value corresponding to the comparison result. Note that decision circuits 548a-b preferably have different decision threshold values $U_{thr\ a}$ and $U_{thr\ b}$, respectively, where $U_{thr\ a}>U_{thr\ b}$, and the sample bit generated by decision circuit 548b is inverted in an inverter 550. The outputs of decision circuit 548a and inverter 550 are coupled to an "OR" gate 552 adapted to apply an "OR" function to the received sample bits and generate bit stream 562. An appropriate time-delay element, $\Delta t_{ab}$, is inserted between gate 552 and decision circuit 548a to compensate for the relative time delay between the sample bits and processing time of inverter 550.

Figure 6:
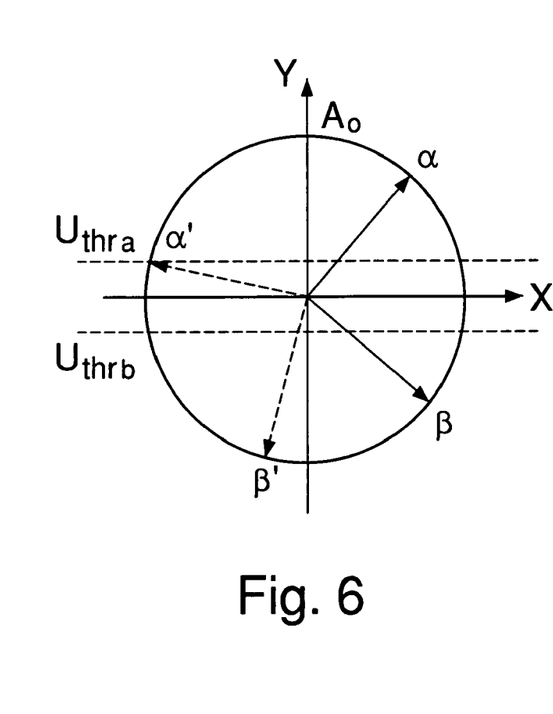
FIG. 6 graphically illustrates sample-bit processing implemented in the receiver shown in FIG. 5.

FIG. 6 shows a phasor diagram that graphically illustrates sample-bit processing implemented in receiver 500. The phasor diagram shown in FIG. 6 is analogous to that shown in FIG. 3B and depicts signal 222 as a rotating vector. In a preferred configuration, the wavelength of local oscillator 204 in receiver 500 (see also FIG. 2) is selected in accordance with Eq. (4) as follows:

$$\Delta\omega\Delta t_{ab}=\pi/2 \qquad (4)$$

which causes the positions of the rotating vector corresponding to the sampling points of decision circuits 548a-b (designated α and β respectively) to be separated by 90 degrees. The two sets of vectors labeled (α, β) and (α', β') correspond to two different values of the initial phase shift $\phi_0$. From different vector orientations exemplified by these two sets, one can determine that, if the decision threshold values of decision circuits 548a-b are selected from the following ranges:

$$0<U_{thra}<A_0/\sqrt{2} \qquad (5a)$$

$$-A_0/\sqrt{2}<U_{thrb}<0 \qquad (5b)$$

then, for any value of $\phi_0$, at least one vector in a vector set has a Y-axis projection value outside the range between $U_{thr\ a}$ and $U_{thr\ b}$. As a result, at least one of the sample bits corresponding to an optical "1" will have a value of "1", and "OR" gate 552 will output a binary "1" into bit stream 562, thereby correctly interpreting the corresponding optical bit.

Processing of an optical "0" in receiver 500 is similar to that in receiver 200. Briefly, for an optical "0", the amplitude of the rotating vector shown in FIG. 6 is substantially zero. As a result, each sample bit generated by decision circuits 548a-b during the corresponding sampling interval is also zero. "OR" gate 552 applying an "OR" function to two zeros will output a binary "0" into bit stream 562, thereby correctly interpreting the corresponding optical bit.

While this invention has been described with reference to illustrative embodiments, this description is not intended to be construed in a limiting sense. For example, one skilled in the art will appreciate that a receiver of the invention may be designed to have a different number of sampling points from that in receiver 200. A phasor diagram substantially identical to that shown in FIG. 3B can be realized, e.g., when the wavelength of local oscillator 204 in receiver 200 is selected in accordance with Eq. (6):

$$\Delta\omega \Delta t_0 = 4\pi/3 \quad (6)$$

Similarly, a phasor diagram substantially identical to that shown in FIG. 6 can be realized, e.g., when the wavelength of local oscillator 204 in receiver 500 is selected in accordance with Eq. (7):

$$\Delta\omega \Delta t_{ab} = 3\lambda/2 \quad (7)$$

The values of $\Delta t_0$ and $\Delta t_{ab}$ can be optimized to provide best results for the given bandwidth of photo-detectors 214a-b and differential amplifier 220. Optical couplers producing a phase shift different from 180 degrees can be used instead of optical coupler 208. Although the present invention has been described in reference to an "OR" logical function, one skilled in the art will appreciate that other logical functions can alternatively be used to process sample bits. A receiver of the invention can be designed to have a signal decoder analogous to signal decoder 240 (FIG. 2), which is adapted to sample the IF signal two, three, or more than four times per signaling interval. Similarly, a receiver of the invention can be designed to have a signal decoder analogous to signal decoder 540 (FIG. 5), which has three or more decision circuits. Each decision circuit in signal decoder 540 may be designed to sample the IF signal multiple times per signaling interval. Inverter 550 and time delay $\Delta t_{ab}$ in signal decoder 540 may be placed in the same signal path. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of signal processing, comprising:
   (A) converting a first optical signal into an electrical signal having an intermediate frequency and an amplitude corresponding to optical power of the first optical signal;
   (B) sampling the electrical signal two or more times per signaling interval to generate two or more signal samples, wherein there is a relative time delay between first and second signal samples of the two or more signal samples;
   (C) comparing each of the first and second signal samples with a decision threshold value to generate first and second sample-bit values; and
   (D) applying a logical function to the first and second sample-bit values to generate a bit sequence corresponding to the optical signal, wherein:
      the first optical signal has a first wavelength;
      step (A) comprises mixing the first optical signal with a second optical signal having a second wavelength, wherein the intermediate frequency corresponds to wavelength difference between the first and second wavelengths; and
      for a signaling interval corresponding to an optical "1", the relative time delay and the wavelength difference cause at least one of the first and second signal samples to be greater than the decision threshold value.

2. The method of claim 1, wherein the second optical signal is generated by an optical source without receiving feedback from a signal decoder that implements steps (A) through (D).

3. The method of claim 1, wherein the relative time delay between the first and second signal samples and a relative time delay between the second signal sample and a third signal sample are substantially equal.

4. The method of claim 3, wherein each relative time delay corresponds to a phase shift at the intermediate frequency of about 120 degrees.

5. The method of claim 1, wherein the relative time delay between the first and second signal samples corresponds to a phase shift at the intermediate frequency of about 90 degrees.

6. The method of claim 1, wherein:
   the first optical signal is WDM signal, wherein the first wavelength corresponds to a WDM channel; and
   the second optical signal is a continuous wave signal.

7. The method of claim 1, wherein:
   step (C) comprises:
      comparing the first signal sample with a first decision threshold value to generate the first sample-bit value;
      comparing the second signal sample with a second decision threshold value to generate the second sample-bit value; and
   step (D) comprises:
      inverting the second sample-bit value.

8. The method of claim 1, wherein step (D) comprises applying an "OR" function to the two or more sample-bit values to generate a bit of the bit sequence.

9. The method of claim 1, wherein the first optical signal is an intensity-modulated signal.

10. The method of claim 1, comprising:
    sampling the electrical signal four times per signaling interval to generate four sample-bit values; and
    utilizing three of the four sample-bit values in further signal processing while discarding the remaining one sample-bit value.

11. An optical receiver, comprising:
    a signal converter adapted to convert a first optical signal into an electrical signal having an intermediate frequency and an amplitude corresponding to optical power of the first optical signal; and
    a signal decoder coupled to the signal converter and adapted to:
       (i) sample the electrical signal two or more times per signaling interval to generate two or more signal samples, wherein there is a relative time delay between first and second signal samples of the two or more signal samples; and
       (ii) compare each of the first and second signal samples with a decision threshold value to generate first and second sample-bit values; and
       (iii) apply a logical function to the first and second sample-bit values to generate a bit sequence corresponding to the optical signal, wherein:
          the first optical signal has a first wavelength;
          the signal converter is adapted to mix the first optical signal with a second optical signal having a second wavelength, wherein the intermediate frequency corresponds to wavelength difference between the first and second wavelengths; and for a signaling interval corresponding to an optical "1", the relative time delay and the wavelength difference cause at least one of the first and second signal samples to be greater than the decision threshold value.

12. The receiver of claim 11, wherein
the signal converter comprises:
a local oscillator adapted to generate the second optical signal;
an optical coupler adapted to mix the first optical signal with the second optical signal to generate third and fourth optical signals; and
a pair of photo-detectors coupled to a differential amplifier, wherein the third and fourth optical signals are converted into the electrical signal having the intermediate frequency.

13. The receiver of claim 12, wherein the local oscillator is adapted to generate the second optical signal without receiving feedback from the signal decoder.

14. The receiver of claim 12, wherein:
the first optical signal is WDM signal, wherein the first wavelength corresponds to a WDM channel; and
the second optical signal is a continuous wave signal.

15. The receiver of claim 11, wherein the relative time delay corresponds to a phase shift at the intermediate frequency of about 120 degrees.

16. The receiver of claim 11, wherein the relative time delay corresponds to a phase shift at the intermediate frequency of about 90 degrees.

17. The receiver of claim 11, wherein the signal decoder comprises:
a decision circuit coupled to the signal converter and adapted to sample the electrical signal two or more times per signaling interval to generate two or more sample-bit values;
a de-multiplexer having an input port and two or more output ports, wherein:
the input port is coupled to the decision circuit;
each of output ports is adapted to receive a different bit corresponding to the samples of the electrical signal; and
a logic gate coupled to the output ports and adapted to apply the logical function to the two or more sample-bit values to generate a bit of the bit sequence.

18. The receiver of claim 17, wherein:
the decision circuit is adapted to sample the electrical signal four times per signaling interval to generate three sample-bit values and one unutilized bit;
the de-multiplexer has four output ports, wherein:
three of the output ports are adapted to receive the three sample-bit values; and
the remaining output port is adapted to receive the unutilized bit; and
the logic gate is an "OR" gate coupled to the three output ports and adapted to apply an "OR" function to the three sample-bit values.

19. The receiver of claim 11, wherein the signal decoder comprises:
at least first and second decision circuits, each coupled to the signal convener and adapted to sample the electrical signal at least one time per signaling interval, wherein:
the first decision circuit is adapted to generate the first sample-bit value;
the second decision circuit is adapted to generate the second sample-bit value; and
the first and second decision circuits sample the electrical signal with the relative time delay; and
an inverter coupled to the second decision circuit and adapted to invert the second sample-bit value.

20. The receiver of claim 19, wherein the signal decoder comprises an "OR" gate coupled to the first decision circuit and the inverter and adapted to apply an "OR" function to the first sample-bit value and the inverted second sample-bit value to generate a bit of the bit sequence.

21. The receiver of claim 19, wherein each decision circuit is adapted to compare a sample of the electrical signal with a respective decision threshold value to generate an output-bit value.

22. The receiver of claim 21, wherein:
the first decision circuit is adapted to compare the first signal sample a first decision threshold value to generate the first sample-bit value; and
the second decision circuit is adapted to compare the second signal sample with a second decision threshold value different from the first decision threshold value to generate the second sample-bit value.

23. An optical communication system, comprising an optical receiver adapted to receive a first optical signal via a communication link, wherein the optical receiver comprises:
a signal converter adapted to convert the first optical signal into an electrical signal having an intermediate frequency and an amplitude corresponding to optical power of the first optical signal; and
a signal decoder coupled to the signal converter and adapted to:
(i) sample the electrical signal two or more times per signaling interval to generate two or more signal samples, wherein there is a relative time delay between first and second signal samples of the two or more signal samples; and
(ii) compare each of the first and second signal samples with a decision threshold value to generate first and second sample-bit values; and
(iii) apply a logical function to the first and second sample-bit values to generate a bit sequence corresponding to the optical signal, wherein:
the first optical signal has a first wavelength;
the signal converter is adapted to mix the first optical signal with a second optical signal having a second wavelength, wherein the intermediate frequency corresponds to wavelength difference between the first and second wavelengths; and
for a signaling interval corresponding to an optical "1", the relative time delay and the wavelength difference cause at least one of the first and second signal samples to be greater than the decision threshold value.

24. The system of claim 23, wherein
the signal converter comprises:
a local oscillator adapted to generate the second optical signal;
an optical coupler adapted to mix the first optical signal with the second optical signal to generate third and fourth optical signals; and
a pair of photo-detectors coupled to a differential amplifier, wherein the third and fourth optical signals are convened into the electrical signal having the intermediate frequency.

25. The system of claim 24, wherein the local oscillator is adapted to generate the second optical signal without receiving feedback from the signal decoder.

* * * * *

UNITED STATES PATENT AND TRADEMARK OFFICE
CERTIFICATE OF CORRECTION

PATENT NO. : 7,330,669 B2 Page 1 of 1
APPLICATION NO. : 10/827824
DATED : February 12, 2008
INVENTOR(S) : Lothar Benedict Erhard Josef Moeller It is certified that error appears in the above-identified patent and that said Letters Patent is hereby corrected as shown below:

In Column 9, line 60, replace "the signal convener and adapted to sample the electrical" with --the signal converter and adapted to sample the electrical--.

Signed and Sealed this

Eighth Day of July, 2008

JON W. DUDAS
*Director of the United States Patent and Trademark Office*